Patented Dec. 5, 1939

2,181,931

UNITED STATES PATENT OFFICE 2,181,931

PROCESS FOR EXTRACTING THE ESSENTIAL PRINCIPLES OF HOPS

Lyndon D. Wood, Chicago, Ill., assignor to National Hops Laboratories, Inc., Chicago, Ill., a corporation No Drawing. Application June 8, 1937,
Serial No. 147,141

8 Claims. (Cl. 87—28)

The object of this invention is a new process of extracting the essential principles of hops.

Hops are a necessary ingredient in the making of all beer and ale, for which no substitute has been found. There are several elements in hop flowers or blossoms which contribute to the taste, aroma, and the preservation of the beer and ale. These are:

First, hop oil—a volatile, aromatic oil contained in small cells or cysts in the individual blossom leaves of the hops. The hop oil content of fresh hops is only from ½% to 1% by weight of dried hops. It is supposed to impart to the beer what is known as the hop aroma.

In order to preserve the hops they are partially dehydrated. The heat to which hops are subjected in drying kilns after they are picked, which varies from 120 degrees to 150 degrees Fahrenheit, together with the passage of the warm air through the hops evaporates a considerable portion of this oil. After drying, the hops are compressed, baled, and stored. In storage there follows a further evaporation and oxidation of the hop oil. This oxidation of the oil finally results in rancidity, which makes the hops entirely worthless for brewing purposes by imparting the rancid odor to the beer. A further evaporation of this oil occurs in brewing, so that finally there is very little, if any, aroma of hops left in the finished beer.

I have found that the evaporation of the hop oil and aroma can be stopped entirely by the use of certain oils and solvents. The best solvents for hop oil are acetone, ethyl acetate, various forms of refined petroleum, and some of the products derived from the manufacture of gasoline, such as naphtha, propane, hexane, etc. The best medium for stopping the evaporation of this hop oil is an oil found within the hop seeds more particularly described hereafter.

I have also found that the rancidity or objectionable odor can be entirely removed from old and rancid hops and the original odor of fresh hops restored by the use of activated carbon, and the extract made as fresh and sweet as though made from new, fresh hops. I believe the use of activated carbon for this purpose is entirely new.

Second, the seeds of the hops, which are about the size of clover seed and in domestic hops range in percentage of the entire weight of dried hops from 2% to 18%, contain an oil. This oil is a bland, fixed oil, and is found in the protein content of the seeds. The seeds are covered by hard horny shells or husks to which quantities of the lupulin sometimes adheres. In the process of brewing the seeds are not broken, and this hop seed oil remains within the seeds and within the husks. I have found that this oil when made available in the hot water of brewing has the peculiar property of adding foam to the beer and retaining it; and that beer which contains a small fraction of this hop seed oil will retain its foam or head much longer than beer which contains none of it. I have also found this oil has a definite affinity, for the hop oil found in the leaf of the hops, and when liberated from the seed combines with the hop oil taken from the blossom leaves and operates to retard and stop the evaporation of the hop oil. The hop seed oil content of the seed is from 20% to 25% by weight. Dried hops having 10% by weight of hop seeds, therefore, contain about 2½% of hop seed oil.

Third, dried, bulk hops contain tannin and tannic acid. This is found in the hops in very small proportions, estimated at from 1½% to 2½% by weight of the dried hops. It is desired in the ber because many brewers think it has some preservative qualities. Tannin is readily soluble in alcohol and water, and can be extracted from the hops blossoms very easily.

Fourth, lupulin. This is a resinous, amorphous substance, originally appearing in the hops blossoms as pollen does in the blossoms of many flowering plants. It has a pronounced bitter flavor which is imparted to the beer in the process of brewing. Lupulin contains resins both hard and soft. The soft resins known as "A" and "B" are the ones most valuable in brewing, as the hard resins are not entirely soluble in the brewing process. Lupulin hardens as the age of the hops increases. New or fresh hops yield on analysis from 12% to 20% of soft resins, which are readily soluble in the hot water used in the brewing process. Lupulin from older hops contains the same amount of resins, but it is found that this resinous content of the lupulin has hardened to some extent and in the boiling process of brewing, the hops yield only from 6% to 10% of soft resins soluble in the brewing process. Lupulin is only partly soluble in either petrolic ether, alcohol, methanol, high grade gasoline, ethyl acetate, etc., and in certain hot, fatty oils. I have found it almost completely soluble in acetone, and I believe the use of acetone as a solvent for lupulin, particularly for the hard or gamma resins, which such lupulin contains, is entirely new.

The present process universally followed in the use of hops in brewing does not release or liberate any of the hop seed oil contained within the hop seeds. It does not liberate all of the hop oil contained in the cysts of the leaves of the blossoms, nor is any of the hardened lupulin liberated or transmitted into the beer.

The loss in brewing value of the hops under the present process of brewing has been estimated by various brewing engineers at from 50% to 80% of the hop value contained in bulk hops.

In the preparation of hops for extraction purposes it is necessary, in order to liberate the hop seed oil content within the hop seeds and to liberate the hop oil from the small cells of the leaves themselves, that the whole mass be finely pulverized or ground before submitting them to the action of the solvent.

The process which I have designed for the making of hops extract is entirely a cold one. It does not set free or evaporate any of the aromatic hop oil.

My process is essentially as follows:

My first procedure is to suitably prepare the hops by pulverizing them to a degree of fineness sufficient to crush all of the seeds which they contain and finely enough so that they will pass a 20 mesh screen or sieve. This may be done in any one of several types of mills which can be adapted for the work such as a ball mill, plate mill, roller mill, or a cutting mill, or a combination of cutting and hammer mill. The mill should be enclosed so that no air current are present in which the aroma of the hops can be dispersed. From the mill the prepared or pulverized hops should be conveyed to a closed tank or receptacle where the solvent is applied.

When old hops are used in which the lupulin has hardened and particularly those in which a rancid odor has occurred from the oxidation of hop oil, I employ activated carbon, which may be made from the vegetable, fibrous material of the hops residue after extraction has been made. This activated carbon may be used in two ways.

(a) By mixing it in finely powdered form with the pulverized hops while they are in a dry state. When this method is employed ¼ ounce of activated carbon will be used to each pound of pulverized hops. The prepared hops should be stirred and shaken until the activated carbon has been thoroughly mixed with them, then be permitted to stand in a closed container for a period of time not less than two hours. The activated carbon experiments have shown restores the odor of fresh hops.

(b) Or, the activated carbon may be applied to the liquid extract in which ¼ ounce of activated carbon is used to each pound of the extract, permitting it to slowly settle and after a period of from two to four hours the carbon may be removed from the extract by filtration or the extract may be removed from the carbon by means of a syphon.

I then mix with the powdered hops a solvent, namely, acetone.

The amount of solvent applied will depend somewhat upon the amount of moisture present in the dried hops, and also upon their age which affects the percentage of gamma or hardened resins they contain. In general, however, it will be found that one pound of solvent should be applied to one pound of pulverized hops. This application of solvent should be made in a closed container as the solvent is volatile and in an open container evaporates rapidly carrying off by evaporation a small fraction of the desirable hop aroma.

The length of time which the pulverized hops should be submitted to the action of the solvent in the closed container will depend upon the age of the hops and the extent to which the resins in the lupulin have hardened. If the hops are fresh and have been dehydrated at low temperatures the percentage of hardened or gamma resins will be less than those in hops which were subjected to a higher degree of heat in dehydrating, and particularly those of older growth and those which have been stored in uncooled warehouses. For fresh hops dehydrated at low temperatures and kept in cooled storerooms an hour will be sufficient time for the action of the solvent to soften and make a soluble the lupulin. For hops of older growth and those which were subjected to greater heat in drying and storing; the period of time which they would be subjected to the action of the solvent might be extended to twenty-four hours or even longer.

After the hops have been submitted to the action of the solvent for the required period of time, they should be moved in a closed conveyor to a percolator, also closed, for the extraction of a considerable portion of the solvent and extract. This process of percolation may be expedited by the use of a vacuum pump if desired.

The extract thus obtained by percolation will contain nearly all of the solvent employed, but will not contain as large percentage or fraction of the resinous lupulin as it will carry. The extract obtained by this percolation may then be reemployed on another similar portion of pulverized hops, and the process repeated until the solvent has reached the point of saturation which will be indicated by its specific gravity as well as by the degree of its liquidity.

After the pulverized hops have been submitted in this way to the action of the solvent in the tank and in the percolators the hops are then conveyed in a closed container to a press, preferably of the hydraulic type in which sufficient pressure is applied to express from the hops all of the extract obtainable, after which the residue of hops will be found upon inspection or analysis to contain nothing but vegetable fibrous material and no tannin, oils, or lupulin. This shows that all of the essential principles of the hops have been entirely extracted.

The press used for this purpose may be either of the hydraulic or the screw or rotary type. I prefer the hydraulic type because the expeller presses develop considerable heat due to the rotary, grinding pressure employed, which results in driving off further portions of the volatile hop oil.

In the common forms of hydraulic press the usual cage or chamber in such presses for holding and expressing vegetable material are not satisfactory for our purpose. The hops mass submitted to the pressure contains certain portions of air and a considerable portion of liquid extract for which egress must be provided. When pressure is applied the escaping liquid will raise and tilt the cage slightly, and bind the outer surface of the plunger and the inner surface of the cage. The effect of this tilting and binding is to unduly wear the inner surface of the cage and the outer surface of the plunger, forcing the liquid extract upward between the plunger and the cage. This also permits the passage of small particles of the pulverized hops with the liquid.

For the purpose of overcoming this difficulty and providing proper egress for the air and liquid I have designed a cage by drilling into the lower half of the cage or chamber, in which the mass of hops is placed, a number of small openings. These should be V shaped in which the small point of the opening, not more than 1/32 of an inch in diameter, opens into the inner portion of the shell or cage in which the pressure is applied. The wider opening of 1/12 or 1/16 of an inch will be at the outer surface of the shell or cage.

To further facilitate the operation and provide additional egress for the liquid extract, I fit into the bottom of the cage or shell a copper wire screen of 200 mesh which will permit the passage of the liquid extract without permitting any of the vegetable matter to escape.

I further facilitate the passage or egress of the liquid extract by the use of a steel plate 1/2 inch thick resting upon the bed plate of the press and between it and the steel cage containing the hops. This plate should be sufficient in width to extend slightly beyond the outer edge of the cage. On the surface of this plate, next to the bottom of the cage, I cut a number of channels (twelve or more) radiating from the center of the plate to its outer rim. These channels should be 1/16 of an inch or more in width and not more than 1/8 of an inch in depth. They are shallower at the center of the plate and slightly deeper at the outer edge of the plate where the liquid is discharged into grooves cut in the bed plate of the press from which the liquid finds its way into a receptacle under the bed plate of the press.

The liquid extract obtained from these several percolations and from the pressing of the hops is then put into an evaporating pan or jacketed still, and a degree of heat (60° C.) sufficient only to evaporate all the solvent is applied.

After finding by analysis the amount of tannin and lupulin which the extract contains, I carefully measure, weigh, observe its degree of liquidity, and by an observation of its specific gravity, etc., and by applying the same tests to subsequent lots manufactured, I secure uniformity in such subsequent lots by the addition of an amount of alcohol, glyceryl laurate and tanning sufficient to secure such uniformity. The extract thus prepared is then sealed in tin cans or glass containers and is preserved indefinitely in that form until required for use.

What I claim is:

1. A process for extracting the essential principles of hops consisting in finely pulverizing and crushing the entire mass of hops, simultaneously liberating the hop seed oil content of the seeds and the hop oil from the hop blossom leaves, and commingling the hop oil with the hop seed oil to retard or stop evaporation of the hop oil and aroma, recovering a large percentage of hop oil, and submitting the pulverized hops to the action of acetone in a closed chamber.

2. A process for extracting the essential principles of hops, consisting in mixing acetone as a solvent with the powdered hops to soften the resinous hardened lupulin and to recover in available extract form a large percentage of lupulin and the hardened resins which it contains.

3. A process for extracting the essential principles of hops, consisting in submitting the hops to acetone in a closed container for a period of time, and subsequently using percolation, and thereafter applying mechanical pressure to the hops, whereby to recover a large percentage of the volatile hop oil.

4. A process for extracting the essential principles of hops consisting in utilizing the action of acetone as a solvent, adding activated carbon, conveying the hops in a closed container to a press, and applying sufficient pressure to express from the hops all of the essential principles of hops desired and necessary in brewing.

5. A process for extracting the essential principles of hops, consisting in pulverizing the hops, adding activated carbon, mixing with the powdered hops acetone as a solvent in a closed container for the required period of time, obtaining a substantial portion of the extract by percolation, and thereafter applying sufficient pressure to express from the hops all of the extract contained in the hops, whereby to produce an extract containing the same percentage or proportions of hop oil, lupulin tannin and hop seed oil as are found in fresh hops.

6. A process for extracting the essential principles of hops, consisting in pulverizing the hops, adding activated carbon in the proportion of substantially one-fourth ounce of activated carbon to each pound of pulverized hops, mixing with the powdered hops acetone as a solvent in a closed container for the required period of time, obtaining a substantial portion of the extract by percolation, and thereafter applying sufficient pressure to express from the hops all of the extract therein, whereby to produce an extract containing the same percentage or proportion of hop oil, lupulin, tannin and hop seed oil as are found in fresh hops.

7. A process for extracting the essential principles of hops, consisting in pulverizing the hops, mixing acetone with the pulverized hops in a closed container for the required period of time, obtaining a substantial portion of the extract by percolation, thereafter applying sufficient pressure to express from the hops all of the extract contained therein, adding activated carbon in the proportion of one-fourth ounce of activated carbon to each pint of extract, permitting it to slowly settle, and after a period of from two to four hours, separating the carbon and extract by filtration or siphoning, whereby to produce an extract containing the same proportions of hop oil, lupulin, tannin and hop seed oil as are found in fresh hops.

8. A cold process of extracting the essential principles of hops, consisting in finely pulverizing and crushing the entire mass of hops, simultaneously liberating the hop seed oil content of the seeds and the hop oil from the hop blossoms and leaves and mixing the hop oil with the hop seed oil to retard the evaporation of the hop oil and aroma, and applying a solvent to the mass, said process being carried through without the use of heat.

LYNDON D. WOOD.